United States Patent [19]

Jang

[11] Patent Number: 4,705,196
[45] Date of Patent: Nov. 10, 1987

[54] MEASURING DEVICE FOR CANNED POWDERED PRODUCT

[76] Inventor: Marco Jang, 3F, No. 69, Lin-Sen Rd., Yungho City, Taipei Hsien, Taiwan

[21] Appl. No.: 823,366

[22] Filed: Jan. 28, 1986

[51] Int. Cl.$^4$ ............................................. G01F 11/28
[52] U.S. Cl. ................... 222/439; 222/283; 221/265
[58] Field of Search .............. 222/160, 167, 164, 454, 222/284, 283, 438, 439, 440, 434, 436, 556, 548; 221/265, 264

[56] References Cited

U.S. PATENT DOCUMENTS 3,227,313  1/1966  Morena .............................. 222/436
3,893,593  7/1975  Hazard .............................. 221/265

*Primary Examiner*—Joseph J. Rolla
*Assistant Examiner*—Kenneth Noland
*Attorney, Agent, or Firm*—Bucknam and Archer

[57] ABSTRACT

Device for measuring powdered product from a can container comprises a plurality tier of trays or rings rotatably stacked one upon the other and characterized in that, each tray carries a half circle storage excavation, the rest portion remaining solid, the top ring having a cylindrical outlet communicable to the hollow storage space while the bottom ring has tapered guide surface leading from the solid portion toward the hollow portion, and being adapted to the open end of the can container. Under the center of the topmost tray or ring, a shaft is stemmed to pass through the center opening provided in the intermediate trays and circular concave-convex meshable tongue-grooves are provided between adjacent surfaces to facilitate relative rotations. When the device is assembled have the hollow space aligned on top of the opened can, the whole thing is turned upside down, the powdered content in the hollow space is intersected by turning an appropriate intermediate ring, a required amount of the content is clearly cut out and poured out from the outlet without contamination.

7 Claims, 15 Drawing Figures

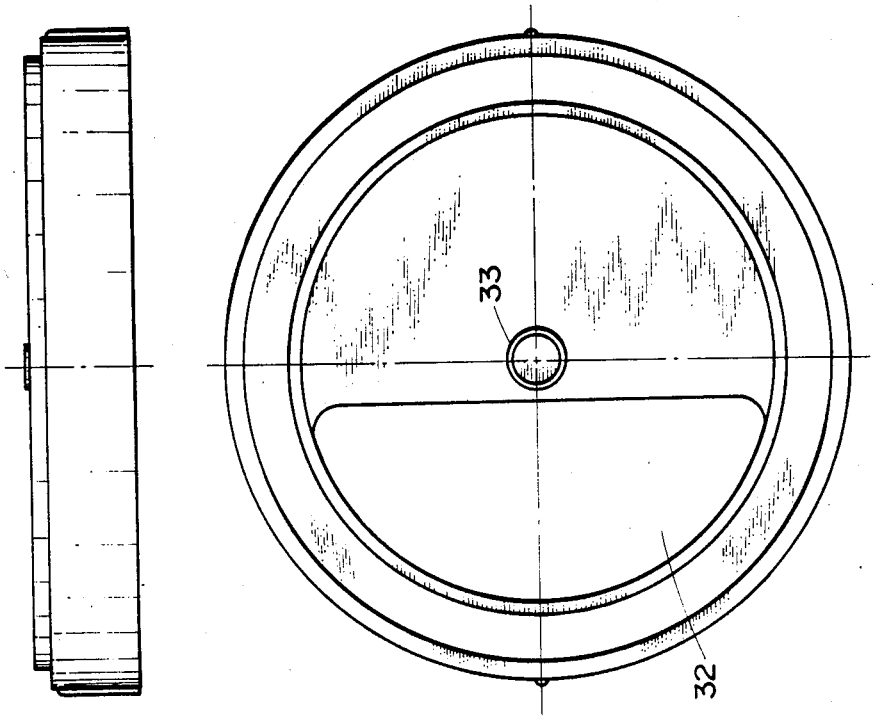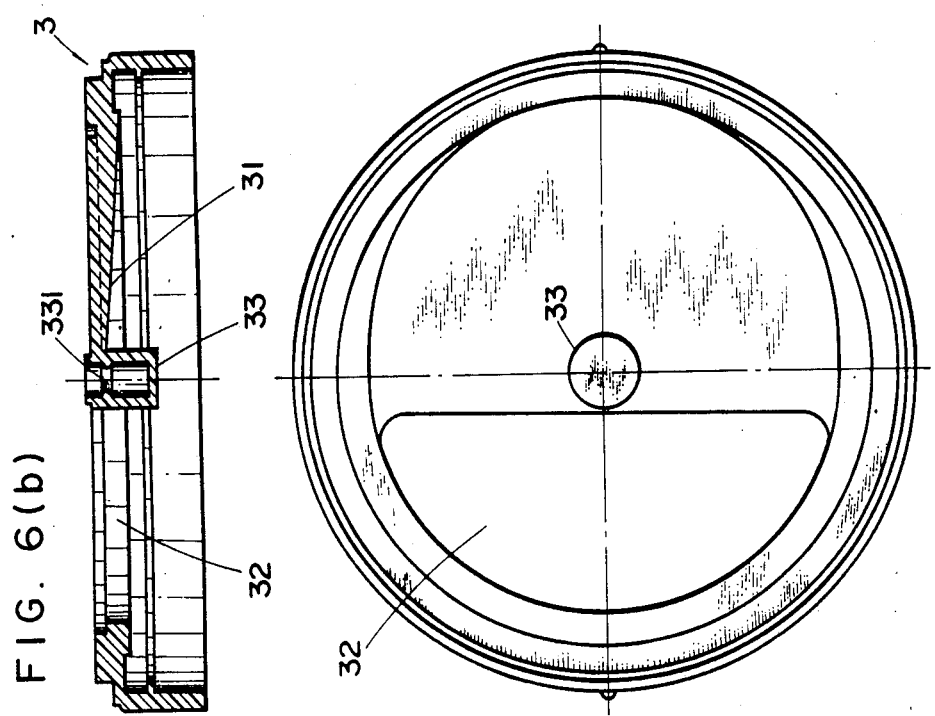

MEASURING DEVICE FOR CANNED POWDERED PRODUCT

The present invention relates generally to a measuring device and more particularly to a quantitative dispensing device for canned powdered products such as milk powder without using measuring spoon or the like, so that no direct contact of hands is involved and contamination is avoided.

In the conventional way of milk powder dispensing, the opened can is exposed to the air, usually a spoon is used to measure the amount required. Foreign material such as bacteria may cause the undesirable contamination. Furthermore, the operation may lead to confusion when the number of spoonfuls is miscounted, the spit or spilth of the content is also liable to pollute the table top area.

The drawbacks of the prior art can easily be eliminated by the device of the present invention. This device comprises a stack of tiers of measuring trays or rings each engaged with its preceding and succeeding one in a rotatable manner. Each tray has a half circular hollow storage area representing a measuring unit such as one-spoonful while the other half circle remaining solid. By coaxial stacking of the trays or rings, the hollow portions of the individual trays are connected to form a storage space which may be intersected by turning an appropriate tray to cut out the required amount of powder with solid portion to block up the storage channel. The whole stack is put on the opened can with the bottom tray jointed thereon, the top tray is provided with a covered outlet. In operation, the can and the device are turned altogether upside down, one of intermediate trays or rings is rotated to cut out exact amount of powder required, then the outlet is uncapped to discharge. The can may be kept always air tight without exposing the content which is insulated from contamination, thus the device in the meantime is served as a cover of the can.

Therefore the main object of the present invention is to provide a measuring device for milk powder dispensing that can cut out an exact required amount by turning of a ring in the device without the aid of any foreign tool such as a spool so that the possible contamination is avoided.

Another object of the present invention is to provide a measuring device for canned milk powder, which device may serve also as a cover from the opening of the can till the can is empty and always kept in an air tight condition.

Still another object of the present invention is to provide a measuring device for canned powder milk wherein the measuring operation can be easily effect by turning of a ring and the exact amount in registered without confusion.

A further object of the present invention is to provide a measuring device for canned powdered milk wherein the measuring is underway in a most neatly manner without pollute the working surface of the table.

Other objects and features of the present invention will become apparent through the following detailed description in accompanying with the annexed drawings. In which:

FIGS. 6a–6d are various views of the bottom ring or tray.

Figure 1:
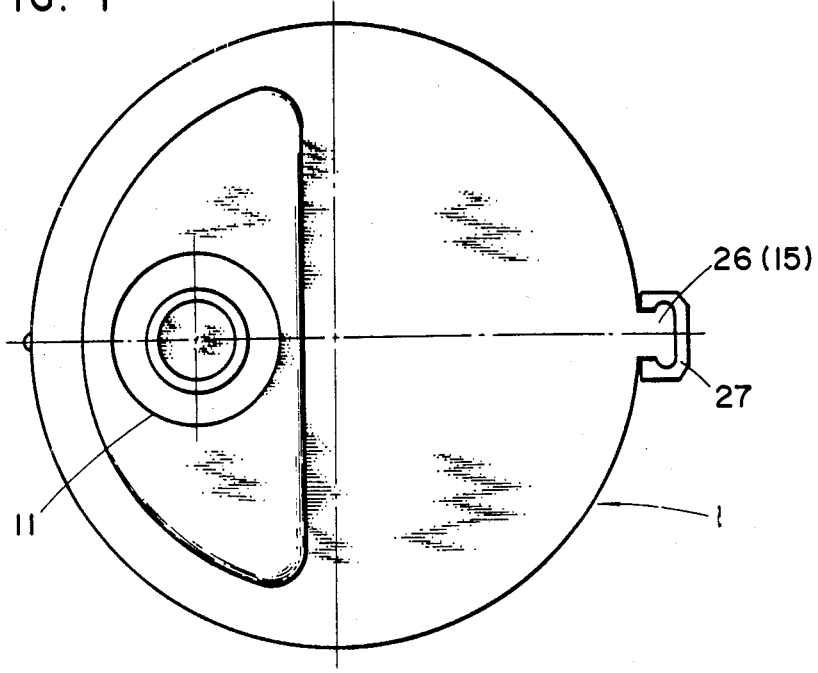
FIG. 1 is a plan view of the milk powder measuring device of the present invention.
Figure 2:
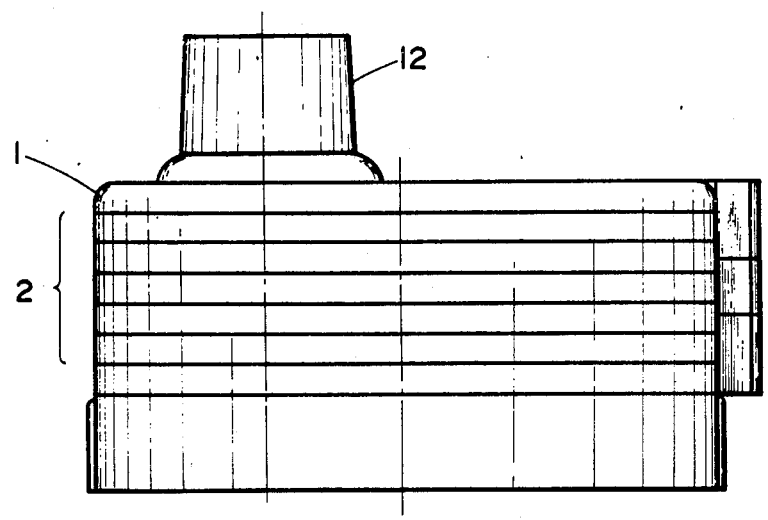
FIG. 2 is a front elevational view of the measuring device of the present invention.

Referring to the drawings, in this preferred embodiment of the present invention, the device 10 involves altogether, from top to bottom, eight trays or rings, including one each top ring 1, bottom ring 3 and a plurality of intermediate rings 2, here namely, six of them. Top ring 1 holds two flat spoonfuls of powdered milk (approximate 9.4 gm., corresponding to the requirement of an one-week old baby), each of the intermediate rings 2 is capable of holding one flat spoonful(equivalent to 4.7 gm.).

Figure 3:
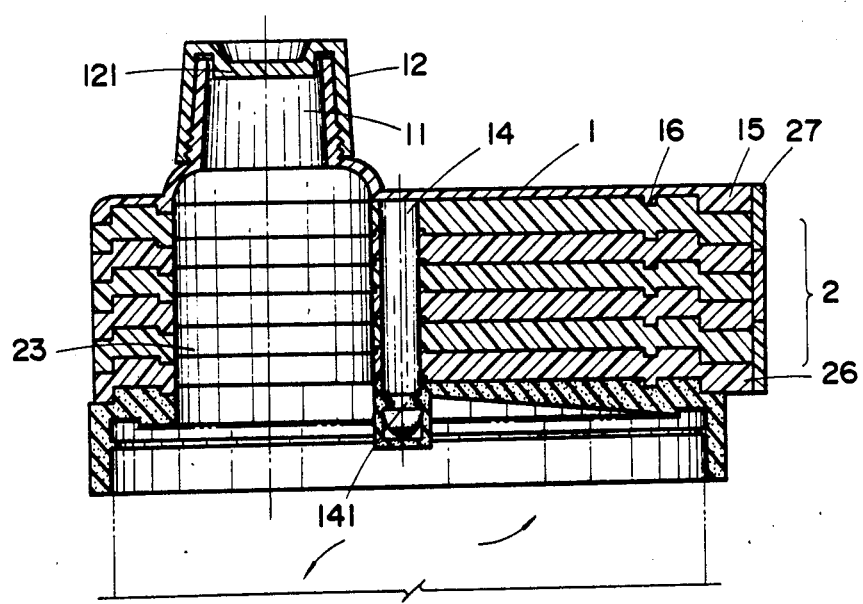
FIG. 3 is a sectional view of the elevation.
Figure 4A:
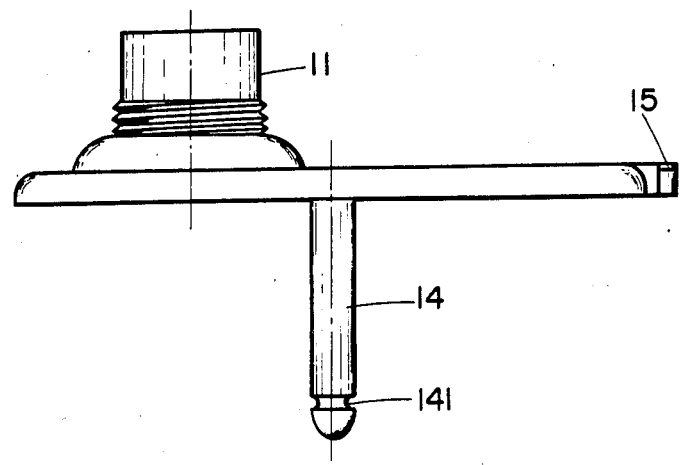
FIGS. 4a–4d are various views of the top ring or tray.
Figure 4B:
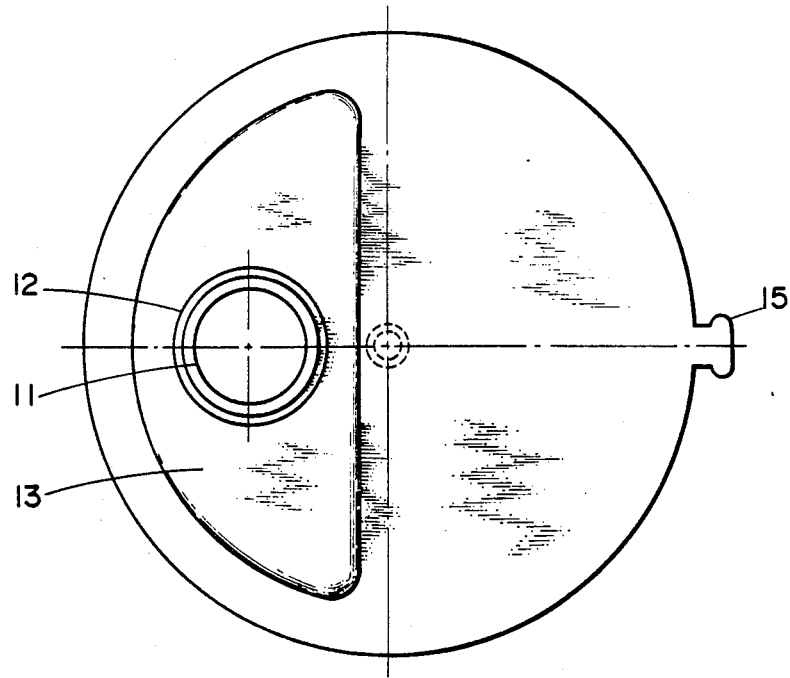
Figure 4C:
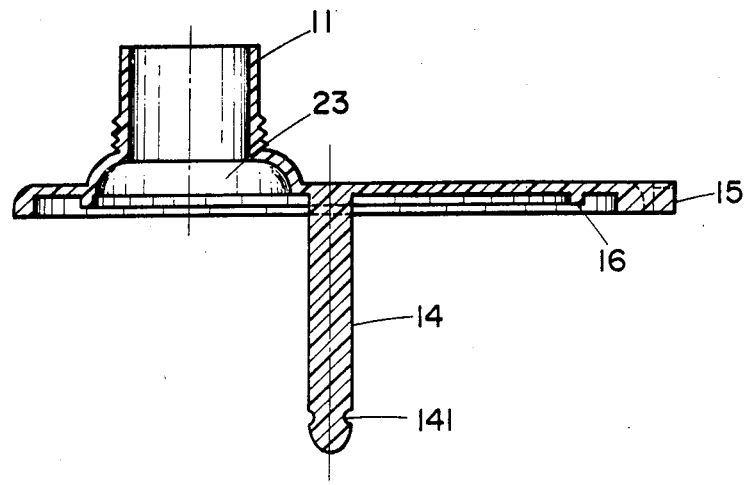
Figure 4D:
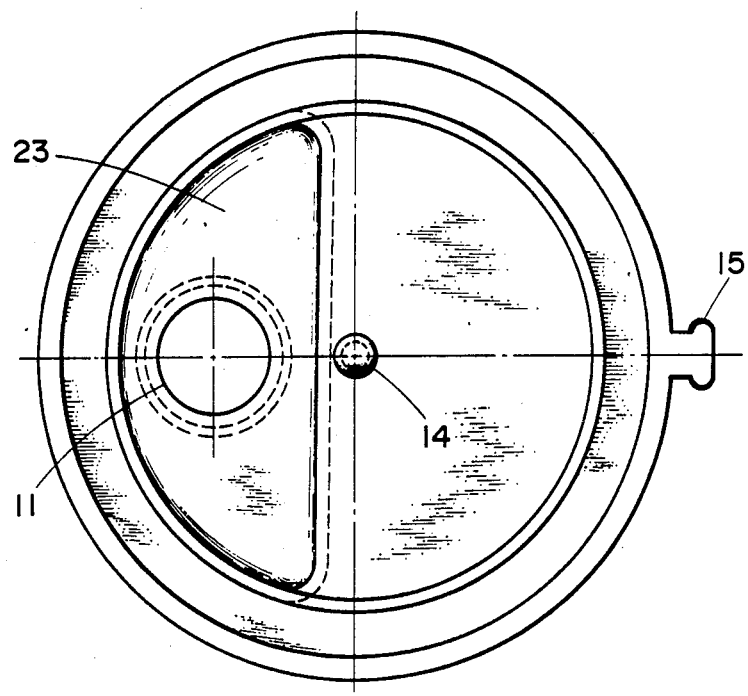
Figure 5D:
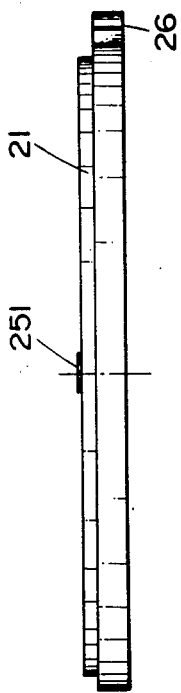
FIGS. 5a–5d are various views of an intermediate ring or tray.
Figure 5B:
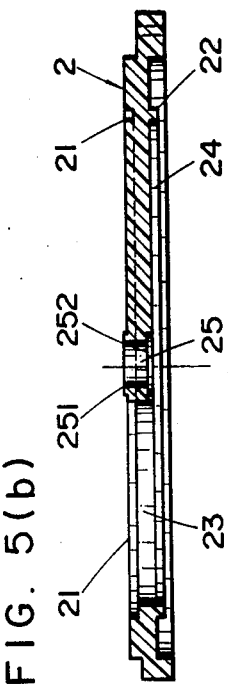
Figure 5C:
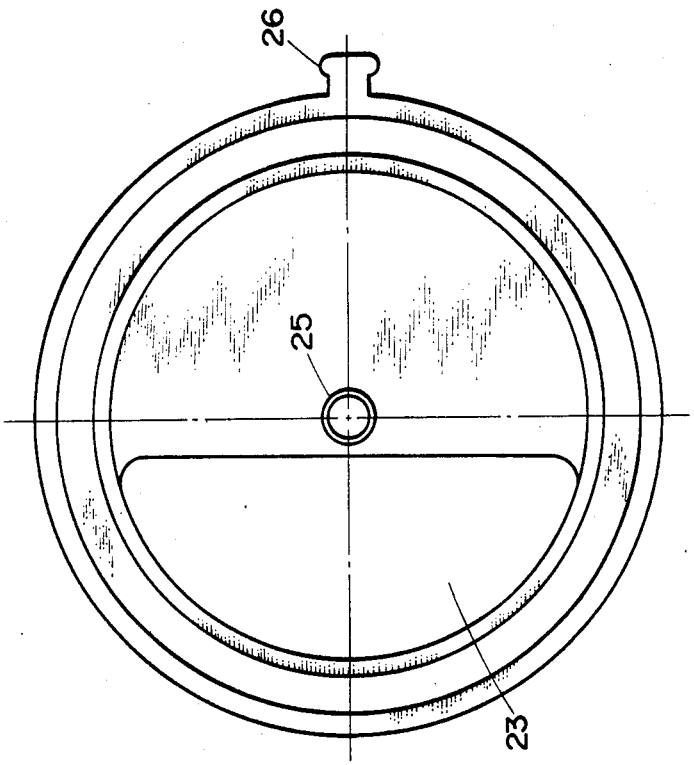
Figure 5A:
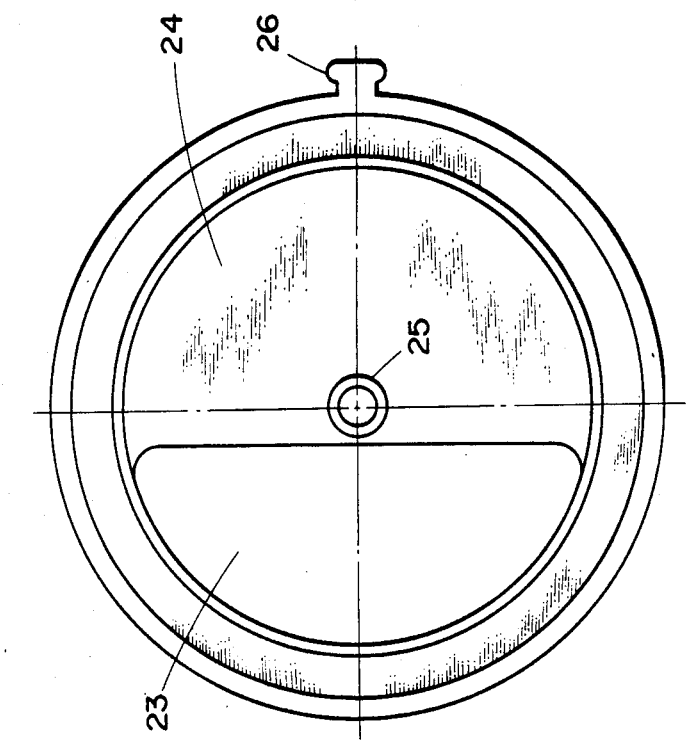

On top of the ring 1, a cylindrical outlet 11 is provided for pouring out the measured content. Outlet 11 has outer male thread to take a cap 11 with air tight plug 121 to prevent the powdered content from spilth or spit out. It can be seen in FIG. 4, that the outlet 11 is communicable with the semi-circular hollow storage area 13 there under form in top ring 1. Alongside the hollow portion 13, a supporting shaft 14 is stemed under the center of the top ring 1, such as shown in FIG. 4(a), near the lower end of the shaft 14, a groove 141 is provided. A mushroom headed tab 15 is disposed at outside edge of the top ring 1. A convex ring 16 is protruded under the surface of the top ring 1, concentric to the shaft 14 and close to the tabbed edge, (FIG. 4C) so as to be meshed into a concave groove provided on top of the upper surface of the intermediate ring 2, such as shown in FIG. 3, to facilitate the rotation about each other.

In FIG. 5, each of the intermediate ring 2 has a lower circular convex tongue 22 and an upper circular concave groove 21 to be connected respectively to the groove of a preceding ring and a tongue of the succeeding ring. Each intermediate tray or ring 2 has a semi-circular hollow space 23 excavated from the ring half, of course the hollow portion 23 can be of any shape other than semi-circular, so far as a hollow storage space can be formed when the trays or rings are coaxially aligned, the rest portion of the ring or tray remains solid as intersector 24. Alongside the hollow portion 23, a collar opening 25 is provided at the center of the intermediate ring 2, concentric to the shaft 14. The opening 25 has an upper convex flange 251 and a lower concave flange 252 to mesh respectively to likewise construction of the preceding or succeeding ring; the collar opening 25 also serves to retain the center shaft 14 and let the intermediate rings 2 to be able to rotate about the shaft 14 and about the adjacent rings. At the outside edge of each intermediate ring 2, a tab 26 like tab 15 is also provided.

In FIG. 6, the bottom ring 3 is to be connected right on top of the opening 4 of a milk powder can. In the solid portion of ring 3, a tapered surface 31 is provided to ease the flow of powdered milk toward the hollow space. All the rings are assembled as shown. in FIG. 3, coaxially and with semi-circular storage spaces 23 aligned. Alongside the hollow portion 31, in the center of the bottom ring 3, a shaft seat 33 is provided to rest the shaft 14. Within the seat, a protruded ring 331 in a resilient nature is provided to fit into the groove 141 near the lower end of the shaft 14 so as to properly locate the respective rings in position. To the solid side of each ring, a tab 26(15) is provided as afore-mentioned for the turning of the ring, a register 27 (FIG. 1) is slidably fitted to said tab to help the rememberance of amount measured without confusion.

In using, when required amount, say five flat spoonful of milk power is to be measured out, simply slide registor 27 to No. 4 ring from the top, turn the can with measuring device up-side down, then rotate the tab 25 of the No. 5 ring, so that the required volume, i.e. five flat spoons of powder is intersected within the hollow storage space. The capacity of measurement ranging from two to eight spoonful is possible with the application of the device of the present invention. The measurement is accurate and clean-cut, no spit or spilth, no contamination of the content. Therefore the device is highly valuable so far as the hygienic point of view is emphasized.

I claim:

1. A device for quantitative measurement of powered product such as milk powder from a can container, comprising a stack of tiers of trays or rings including: a top ring, a bottom ring and a plurality of intermediate rings, and characterized in that: each ring having its half circle excavated to form a hollow storage space, the rest portion remaining solid; the top ring having a cylindrical outlet communicatable to its hollow storage space so that the storage capacity is increased; the bottom ring having a tapered guide surface leading from its solid portion toward the hollow storage space to facilitate pouring of the product content into the hollow storage space, each ring is rotatably and coaxially mounted with its preceding and/or succeeding ring, a shaft is stemmed under the center of the top ring and a center opening is provided to each of the intermediate rings, said shaft is to pass through said openings and rest in a center seat on the bottom ring, dispensing of quantitative measurements of powdered product is accomplished by first attaching the assembled device on top of an open end of the container can, then turning the attached device with can container upside down, then rotating an appropriate ring so that a predetermined quantitative measurement of product is trapped between the solid portion of the rotated appropriated ring and the cylindrical outlet.

2. Device according to claim 1, wherein the cylindrical outlet of the top ring is provided with a screwed cap having air tight sealing plug.

3. Device according to claim 1, wherein each ring is connected to the adjacent ring with a tongue-groove surface or concave-convex relationship concentric ring construction in mutual rotatable and air tight manner.

4. Device according to claim 1, wherein a tab is provided outside the solid portion to effect rotation of the ring, and a register is slidably mounted along the tabs for the keeping count of the exact amount measured without confusion.

5. Device according to claim 1, wherein the volume unit of the hollow storage space is one flat spoonful for each intermediate ring and two spoonfuls for the top ring including the cylindrical outlet.

6. Device according to claim 1, wherein the number of intermediate rings is preferably six.

7. Device according to claim 1, wherein the excavated hollow storage space can be of any shape other than semi-circle.

* * * * *